United States Patent
Schlipf

(10) Patent No.: US 9,488,528 B2
(45) Date of Patent: Nov. 8, 2016

(54) IMMERSION TEMPERATURE SENSOR

(71) Applicant: TÜRK & HILLINGER GMBH, Tuttlingen (DE)

(72) Inventor: Andreas Schlipf, Tuttlingen (DE)

(73) Assignee: TÜRK & HILLINGER GMBH, Tuttlingen (DE)

(*) Notice: Subject to any disclaimer, the term of this patent is extended or adjusted under 35 U.S.C. 154(b) by 537 days.

(21) Appl. No.: 13/845,893

(22) Filed: Mar. 18, 2013

(65) Prior Publication Data
US 2013/0259090 A1 Oct. 3, 2013

(30) Foreign Application Priority Data

Mar. 29, 2012 (DE) .................... 20 2012 003 186 U

(51) Int. Cl.
*G01K 7/04* (2006.01)
*G01K 1/08* (2006.01)
*G01K 1/14* (2006.01)
*G01K 7/02* (2006.01)
*G01K 1/16* (2006.01)

(52) U.S. Cl.
CPC . *G01K 7/02* (2013.01); *G01K 1/14* (2013.01); *G01K 1/16* (2013.01)

(58) Field of Classification Search
USPC .......................... 374/208, 179, 148, 147, 139
See application file for complete search history.

(56) References Cited

U.S. PATENT DOCUMENTS

| 1,828,170 | A | * | 10/1931 | Bristol | ..................... | G01K 1/14 136/232 |
| 3,398,027 | A | | 8/1968 | Lajarrige et al. | | |
| 5,005,986 | A | * | 4/1991 | Najjar et al. | .................. | 374/179 |
| 2011/0150033 | A1 | * | 6/2011 | Egan et al. | .................... | 374/141 |
| 2012/0250727 | A1 | | 10/2012 | Schlipf | | |

FOREIGN PATENT DOCUMENTS

| CH | 689875 A5 | 12/1999 |
| DE | 15 73 310 B1 | 7/1970 |
| DE | 20 2011 004 481 U1 | 5/2011 |
| GB | 127 534 A | 6/1919 |
| JP | 10 160 585 A | 6/1998 |
| JP | 10 221 175 A | 8/1998 |

OTHER PUBLICATIONS

Canadian Office Action of Nov. 4, 2015.

* cited by examiner

*Primary Examiner* — Mirellys Jagan
(74) *Attorney, Agent, or Firm* — McGlew and Tuttle, P.C.

(57) ABSTRACT

A temperature sensor (100, 200, 300) has a thermocouple (101), with a measurement point (102), and a holder (103), with a contact surface (152) and an opening (104). Electric connections (105) of the thermocouple are led through the opening, starting from the measurement point. A first metal jacket (106) is arranged on the contact surface or passes through such that an interior (107) of the first metal jacket is connected to another side of the holder and the measurement point is arranged in an interior (108) of a second metal jacket (109). The second metal jacket is located at least with one section (110) in the interior of the first metal jacket and can be or is connected at least by a partial area of this section to the first metal jacket such that the second metal jacket is fixed in its position relative to the first metal jacket.

18 Claims, 3 Drawing Sheets

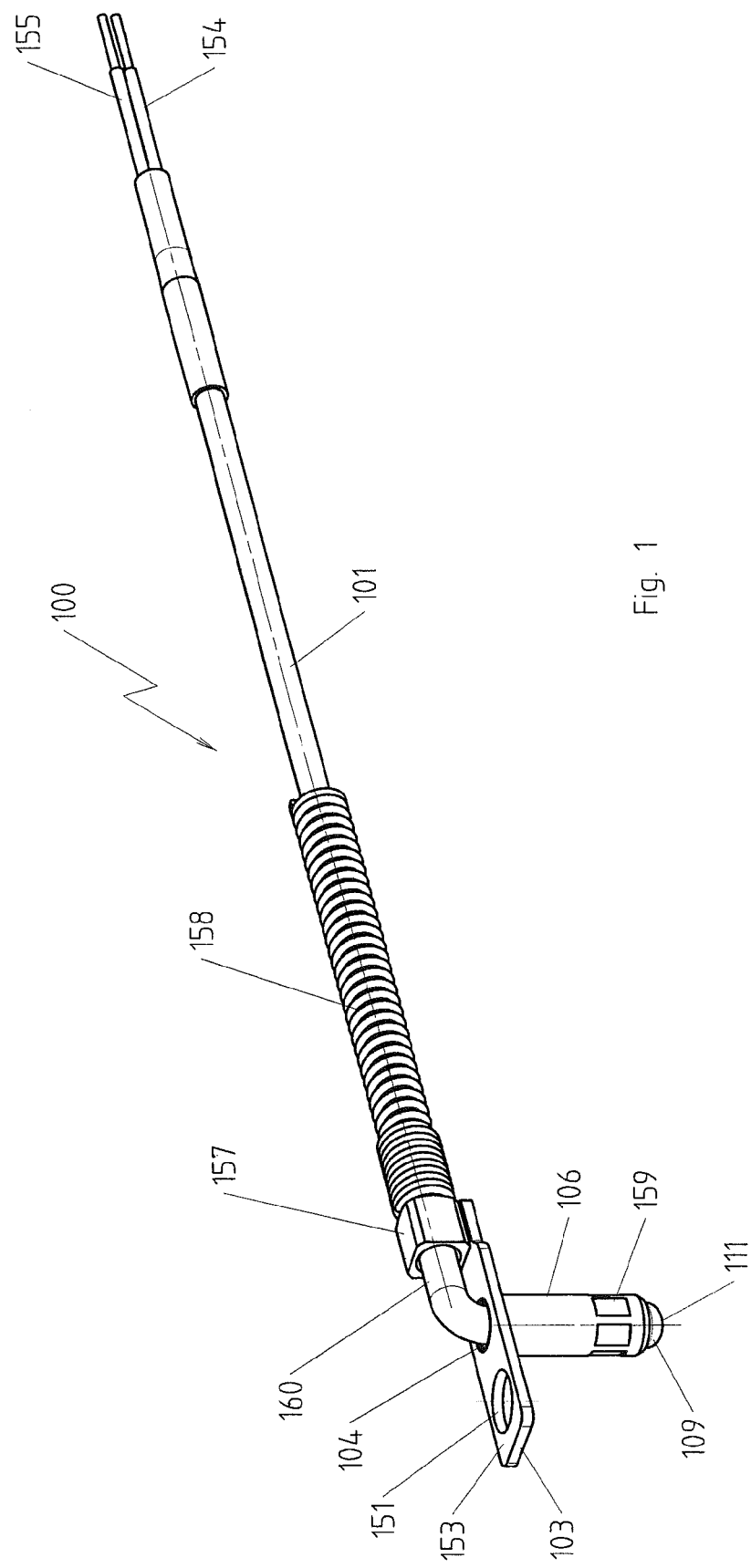

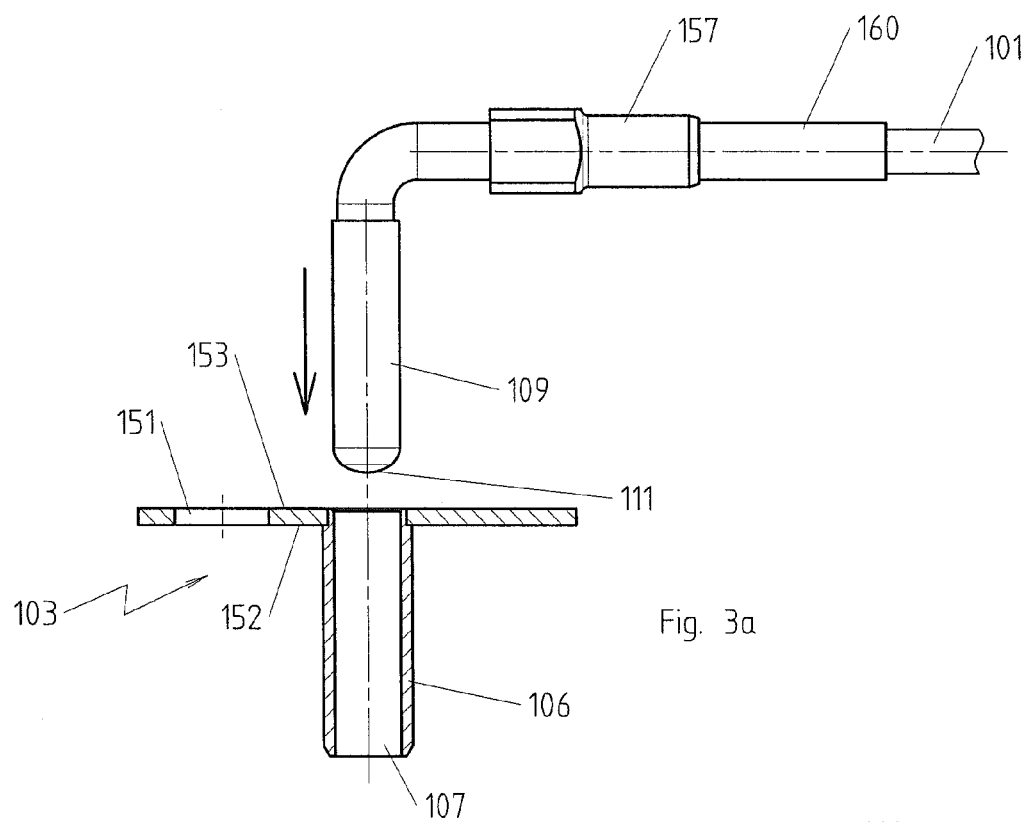
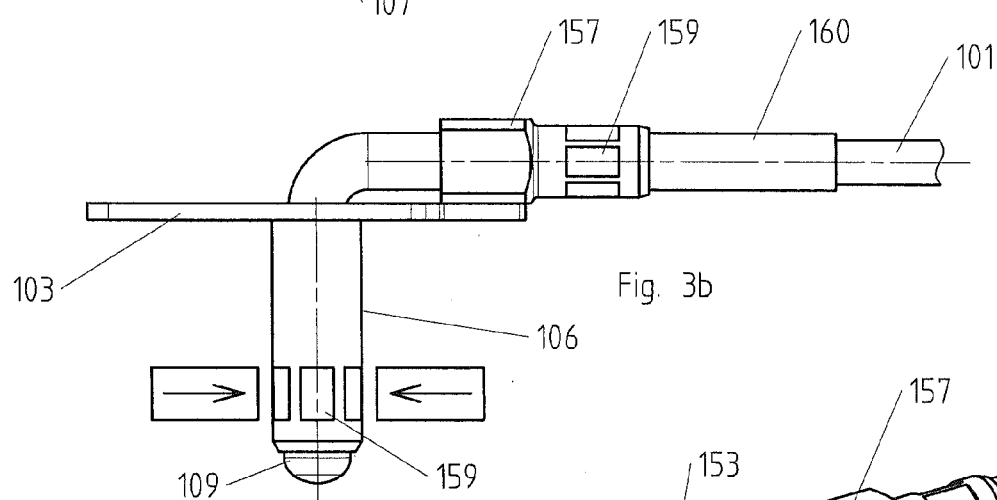
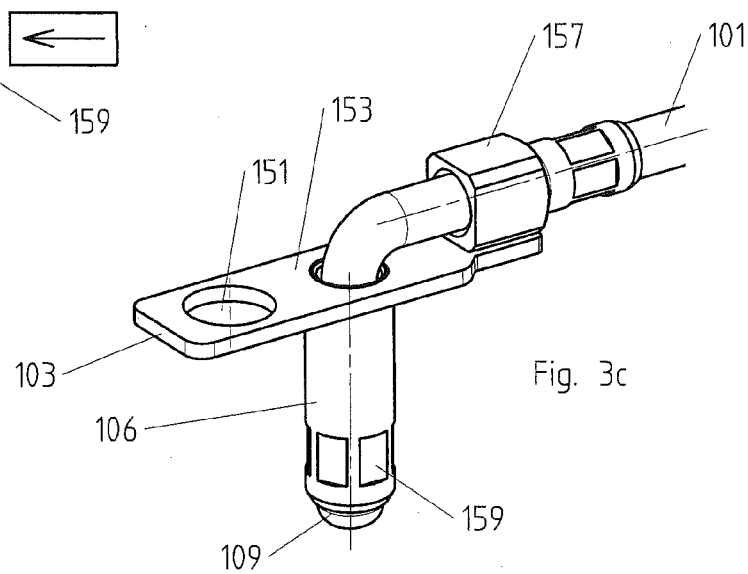

IMMERSION TEMPERATURE SENSOR

CROSS REFERENCE TO RELATED APPLICATIONS

This application claims the benefit of priority under 35 U.S.C. §119 of German Utility Model Application DE 20 2012 003 186.4, filed Mar. 29, 2012, the entire contents of which are incorporated herein by reference.

FIELD OF THE INVENTION

The present invention pertains to an immersion temperature sensor. Such temperature sensors are often used to precisely determine the temperature of heated components. A thermocouple, which is arranged on a holder, is typically inserted in this case into a recess of the component and fastened to the component with a fastening arrangement arranged on the holder. The holder is thus in contact with the component with part of its surface; this part is called "contact surface" in this description.

BACKGROUND OF THE INVENTION

Since the thermocouple, more precisely its measurement point, does not perform any temperature measurements on the surface of the component but quasi only dips into the component in the recess of the component in this arrangement, such temperature sensors are also called "immersion temperature sensors." They are known, for example, from CH 689 875 A5 and DE 20 2011 004 481.

Practice has shown that the measurement results obtained with such a temperature sensor depend very sensitively on where in the interior of the recess of the component the measurement point of the thermocouple is located. Reproducible positioning of the measurement point of the thermocouple in a position in which it has the most intimate thermal contact possible with at least one wall surface of the recess, especially with the bottom thereof, so that the best possible heat transfer is possible from the wall surfaces of the recess to the measurement point, is desirable in this case, in particular.

Temperature sensors are available commercially, in which an attempt is made at defining the position of the measurement point of the thermocouple more precisely such that a metal jacket is arranged on the contact surface of the holder or at least such that said jacket passes partly through said contact surface, such that an interior of the metal jacket is connected through the opening to the side of the holder located opposite the contact surface. The shape of this metal jacket is adapted to the shape of the recess of the component such that the most precise fit possible is obtained. The section of the thermocouple that has the measurement point is inserted into the interior of the metal jacket.

This embodiment of the temperature sensor makes it possible, in particular, to arrange and possibly fix the measurement point before the installation of the temperature sensor on the components at a desired location in the interior of the metal jacket. This is especially true if the metal jacket has an opening on the side located opposite the contact surface of the holder, as in the case of, e.g., a sleeve.

However, the positioning of the measurement point in a given position in the interior of the metal jacket cannot guarantee per se that there indeed is a good thermal contact with the bottom. In addition, it is seen that even though sufficiently good thermal conduction is achieved with the metal jacket from the wall surface of the recess in the component to be heated to the jacket surfaces of the metal jacket, which jacket surfaces define the interior of the metal jacket, there is no sufficiently good heat transfer from these jacket surfaces to the measurement point of the thermocouple. It was therefore found during the practical use of such temperature sensors that even though they lead to an improvement in the reliability of the temperature data determined with them, there still is a need for improvement.

In addition, the response characteristic, i.e., the time elapsing until a change in temperature becomes established, needs to be improved.

SUMMARY OF THE INVENTION

An object of the present invention is therefore to provide a temperature sensor that reduces these problems. This object is accomplished by a temperature sensor having the features according to the invention.

The temperature sensor according to the present invention comprises a thermocouple, which has a measurement point, and a holder, which has a contact surface and an opening.

The term "thermocouple" is defined herein not only as the measurement point at which thermocouple legs consisting of different materials are in contact, but as the entire assembly unit including thermocouple leads or compensating leads that may be possibly connected to the thermocouple legs.

Furthermore, electric connections of the thermocouple starting from the measurement point are led through the opening in the temperature sensor according to the present invention, wherein "electric connections" in the sense of the present invention are defined, on the one hand, especially also as the thermocouple legs of the thermocouple, which consist, as a rule, of different metals or alloys and are connected to one another at the measurement point, and on the other hand, as thermocouple leads or compensating leads that may have been provided.

Furthermore, a first metal jacket is arranged on the contact surface of the holder or such that it passes at least partly through same such that an interior of the first metal jacket is connected through the opening to the side of the holder located opposite the contact surface or to another side of the holder, so that it is possible to lead a thermocouple to the side of the contact surface from another side of the holder.

It is essential for the present invention that the measurement point is arranged in an interior of a second metal jacket, wherein the second metal jacket is located at least with one section in the interior of the first metal jacket and can be or is connected by at least a partial area of this section to the first metal jacket such that the second metal jacket is fixed in its position relative to the first metal jacket.

It is possible with this arrangement to adapt the temperature sensor and especially the position of the measurement point relative to the bottom of the recess of the component to be heated and to achieve improved heat transfer to the measurement point. This leads to an improvement of the reliability of the temperature data obtained.

In addition, this embodiment makes manufacturing in assembly units possible. For example, different thermocouples can be combined with identical or different holders, and different depths of immersion and diameter (dimension) variations can be embodied with thermocouples of identical design in a simple manner. Many variants of customers' wishes can thus be embodied with a small number of components.

Depending on the conditions of application, it may be advantageous for the thermocouple to be insulated and/or free from potentials and/or grounded.

Furthermore, it is advantageous for the second metal jacket with the section of the thermocouple arranged therein to have such a high strength that it cannot be bent by hand. As a result, the reproducible and reliable positioning of the sensor is improved just as well as the safety of the process. The greater strength leads to greater robustness during handling in the manufacturing process, during shipping and installation.

Furthermore, it proved to be advantageous for the edge of the second metal jacket that is located remotely from the measurement point to be arranged within the interior of the first metal jacket. It can be ensured hereby that the overall height remains unchanged when the position of the second metal jacket is adapted within the first metal jacket.

Provisions are made in an especially preferred embodiment of the present invention for an electrically insulating material having good thermal conductivity, in which at least part of the area of the thermocouple extending in the interior of the second metal jacket is embedded, to be arranged in the interior of the second metal jacket. A defined heat transfer to the measurement point is ensured and rapid response characteristic is achieved by such an embedding, which can be readily brought about by strewing in the insulating material having good thermal conductivity in the powdered or granular form, but preferably especially by means of porous ceramic moldings, in each case preferably with subsequent compaction, or by pouring in a liquefied, electrically insulating material having good thermal conductivity, with subsequent solidification of said material or by means of a ceramic putty.

It should be mentioned in this connection, in particular, that compaction leads, as a rule, to an individual change in the length of the second metal jacket, which may lead to an individual change in the depth of immersion and hence to a displacement of the position of the measurement point, which is greater than the narrow tolerances required by the customer. Another undesired side effect is that the pressing pressure is subject to great variations as a result.

However, due to the embodiment of the temperature sensor according to the present invention with a first metal jacket and a second metal jacket, this embodiment can compensate a relative displacement of the two metal jackets in relation to one another in a simple manner.

Materials with a thermal conductivity of at least 1.5 W/m*K are considered to be materials having good thermal conductivity. The use of materials with thermal conductivities of 4 W/m*K or higher is especially preferred.

Even though it is sufficient, in principle, to embed only the measurement point of the thermocouple in the electrically insulating material having good thermal conductivity, which is usually the contact point of two thermocouple legs made of different materials in thermocouples, it is advantageous for the thermocouple legs to be embedded in the electrically insulating material having good thermal conductivity at least in sections of the thermocouple directly adjoining the measurement point with direct contact, because the electrical insulation thereof can thus be ensured. Furthermore, this embodiment leads to an especially good vibration-proofness and shock-proofness and increases the resistance to pressure, tensile or impact loads.

In addition, it is advantageous if sections of the thermocouple at which the thermocouple has insulation are also embedded in the electrically insulating material having good thermal conductivity, because excellent strain relief can thus be achieved. Such sections of a thermocouple are, for example, sections of the thermocouple legs in which these are surrounded by an insulating envelope, insulated sections of a thermocouple lead or compensating lead of the thermocouple, or an insulating envelope that surrounds both thermocouple legs.

It proved to be especially favorable in this connection if the site at which the sections of the thermocouple arranged in the interior of the second metal jacket, on which sections this thermocouple has insulation, pass over in the direction of the measurement point into sections of the thermocouple that have no insulation is located below the contact surface of the holder. This arrangement leads to a further improvement of the tensile strength obtained, because it is ensured in this manner that a sufficiently long insulated section of the thermocouple is embedded in the electrically insulating material having good thermal conductivity.

It is especially preferred if the sections of the thermocouple that are embedded in the electrically insulating material and have insulation are embedded in the electrically insulating material such that the force that is needed to pull them out of the electrically insulating material is higher than 40 N, preferably higher than 60 N and especially preferably higher than 80 N. These values can be reached by correspondingly selecting the electrically insulating material having good thermal conductivity, the degree of compaction and adaptation of the geometry of the arrangement of the thermocouple in the second metal jacket, especially in respect to the length of the insulated section of the thermocouple, which section is embedded in this material.

It is especially advantageous if the electrically insulating material having good thermal conductivity is a mineral insulation or a ceramic insulating material, especially a compacted mineral insulation or a compacted ceramic insulating material. In particular, powdered or granular BN or MgO or an—especially porous—ceramic molding can be used as an electrically insulating material having good thermal conductivity.

Furthermore, it proved to be advantageous if the thermocouple has thermocouple leads or compensating leads that have insulation at least partly and if the thermocouple leads or compensating leads and at least part of the insulation are led out directly from the second metal jacket. This makes possible an especially compact design, and it is, furthermore, unnecessary to use a separate connection sleeve.

A tubular metal sleeve is an especially simple embodiment of the first metal jacket, which can be made available in a cost-effective manner.

It is advantageous for the same reasons to provide the second metal jacket as a cup-shaped metal sleeve with a bottom. Added to this is the fact that a cup-shaped metal sleeve with a bottom also makes it possible especially easily to fill in the electrically insulating material having good thermal conductivity, even though filling in is also possible with the use of a sleeve without bottom, which is filled in a swage and is subsequently compacted.

In one variant of the embodiment of the present invention discussed above, the measurement point is connected to the bottom or is arranged at a distance from the bottom that is shorter than or equal to the radius of the cup-shaped metal sleeve. This arrangement makes it possible to use the bottom as a stop for the measurement point, which leads to better reproducibility of the position of the measurement point in the cup-shaped metal sleeve, to more precise measurement conditions and to a faster response characteristic.

The two metal jackets can be fixed relative to one another in an especially simple manner if the external diameter (dimension) of the second metal jacket in at least one direction is equal to the internal diameter (dimension) of the first metal jacket in that direction, so that the outer surface of the second metal jacket and the inner surface of the first metal jacket are in contact with one another. The two metal jackets can then be adequately fixed to one another, especially caulked, soldered or welded to one another at this site. However, it is especially favorable if the second metal jacket is adapted to the shape of the first metal jacket such that the outside of the jacket surface of the second metal jacket is in contact with the inside of the jacket surface of the first metal jacket in the area that is arranged in the interior space of the first metal jacket. This can be achieved in an especially simple manner in case of jacket surfaces with essentially constant, circular) cross section.

It is especially favorable if the diameter (dimension) of the interior of the second metal jacket equals at least 50% of the diameter (dimension) of the interior of the first metal jacket. This is especially advantageous if the fixation is performed by caulking, because the necessary deformation force is lower. Furthermore, it contributes to improved strength. The presence of a part having a substantially smaller mass is thus avoided in case of welding and soldering to the extent possible, which simplifies these processes.

The arrangement according to the present invention has a temperature sensor according to one of the above-described embodiments and a component to be heated, whose temperature can be monitored with the temperature sensor, wherein the contact surface of the holder is in contact with the component to be heated, wherein the component to be heated has a recess with a bottom, in which the first metal jacket is received, and wherein the second metal jacket protrudes into the recess at least just as far as does the first metal jacket.

Exemplary embodiments of the present invention will be explained in more detail below on the basis of figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a perspective view of an exemplary embodiment of a temperature sensor according to the present invention;

FIG. 3a is a sectional view of a first stage during the manufacture of a temperature sensor;

FIG. 3b is a side view of a second stage during the manufacture of a temperature sensor; and FIG. 3c is a perspective view of a third stage during the manufacture of a temperature sensor.

DESCRIPTION OF THE PREFERRED EMBODIMENTS

Figure 2A:
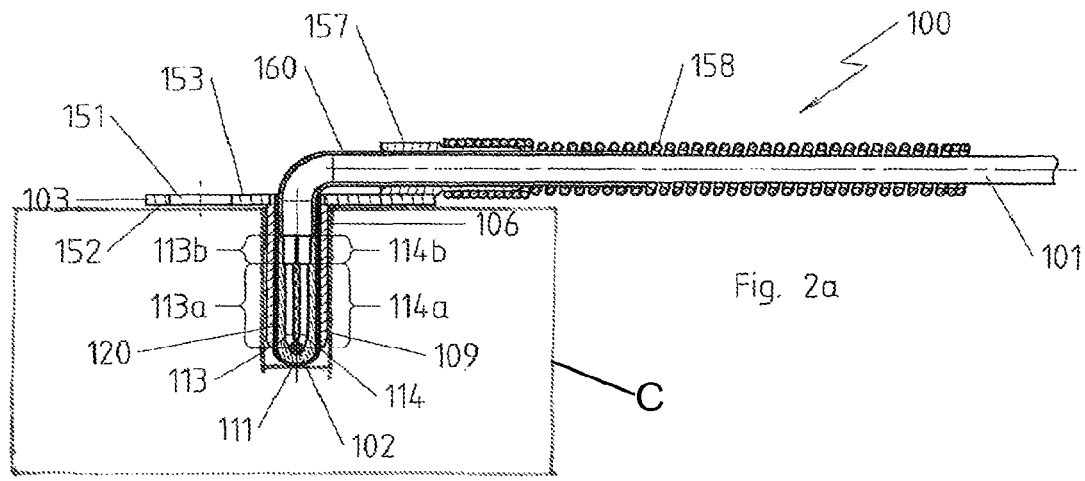
FIG. 2a is a cross sectional view through a partial area of the exemplary embodiment from FIG. 1.

Referring to the drawings in particular, identical components in the embodiments are designated by the same reference numbers in all figures unless stated otherwise.

FIG. 1 shows an exemplary embodiment for a temperature sensor 100 with a holder 103, which is designed as a holding plate in this example and with a thermocouple 101. The holder 103 can be preferably fastened with a fastening means, with which the temperature sensor 100 can be fastened to the component C (see FIG. 2a) whose temperature shall be monitored. FIG. 1 shows a hole 151, which is arranged in the holder 103 and passes through same, as a mount for such a fastening means, which does not necessarily have to be part of the temperature sensor 100, wherein, for example, a screw, not shown, can be screwed through said hole into a corresponding thread of the component, not shown, whose temperature shall be monitored, so that said screw fixes the holder 103 and hence the temperature sensor 100 at the component.

Furthermore, the holder 103 is passed through by an opening 104, which leads from the side of the temperature sensor 100 facing the component to be monitored during the use of the temperature sensor 100, i.e., at the contact surface 152 of the holder 103, which said contact surface is recognizable in FIG. 2a only, to the side located opposite thereto. A first metal jacket 106, which is designed as a metal sleeve in this case, is arranged at the contact surface 152 of the holder 103 such that its interior 107, not recognizable in FIG. 1, is connected through the opening 104 to the side 153 of the holder 103 located opposite the contact surface 152.

Furthermore, FIG. 1 shows the thermocouple 101 with electric connection lines 154, 155 protruding from the connector plug 159 arranged at an end of the thermocouple 101 facing away from the holder 103, via which said lines the thermocouple 101 or a measured temperature value measured by said thermocouple 101 can be controlled and read out by a control and analysis unit, not shown. The connection leads 154, 155 are, as a rule, compensating leads, thermocouple leads or extensions of the thermocouple legs 113, 114 of thermocouple 101.

Thermocouple 101 is passed through a hole 156 of a guide element 157, which is arranged on the side 153 located opposite the contact surface 152 of the holder 103 and which may be, for example, welded, soldered or bonded there, and it [thermocouple] is passed in a section through an anti-kinking spring 158, which is arranged at the guide element 157 and it is thus protected against kinking.

The end of the thermocouple 101 at which the measurement point 102, not recognizable in FIG. 1, is located, is passed through the opening 104 and the interior 107 of the first metal jacket 106 and is arranged in the interior 108 of a second metal jacket 109 designed as a cup-shaped metal sleeve with bottom 111. The second metal jacket 109 is arranged with a section 110 in the interior 107 of the first metal jacket 106 and is in direct contact by this section 110 with the inside of the first metal jacket 106. The arrangement of the measurement point 102 in the second metal jacket 109 will be described below in detail on the basis of FIG. 2a.

It can, furthermore, be recognized from the caulked points 159 shown schematically that the second metal jacket 109 is fixed in its position relative to the first metal jacket 106 by caulking.

FIG. 2a shows a cross section through a partial area of the temperature sensor 100 from FIG. 1. As can be seen especially clearly in this view, the thermocouple 101 has a measurement point 102, at which thermocouple legs 113, 114 are in contact with one another. The thermocouple legs 113, 114 have a first area 113a, 114a, in which they are bare, i.e., are in direct contact with the area surrounding them. They have, furthermore, a second area 113b, 114b, in which they are enveloped by insulation. Over their further course away from the measurement point 120, both thermocouple legs 113, 114 or thermocouple leads or compensating leads, to which the thermocouple legs 113, 114 are connected in an electrically conductive manner, are then enveloped by an insulating tube 160 or also by another type of cable sheathing.

As can be seen in FIG. 2a, both the measurement point 102 and the areas 113a, 113b, 114a, 114b are each embedded in an electrically insulating material 120 having good thermal conductivity. Furthermore, it can be determined from FIG. 2a that measurement point 102 is arranged at a distance from the bottom 111 that is shorter than the radius of the second metal jacket 109.

Figure 2B:
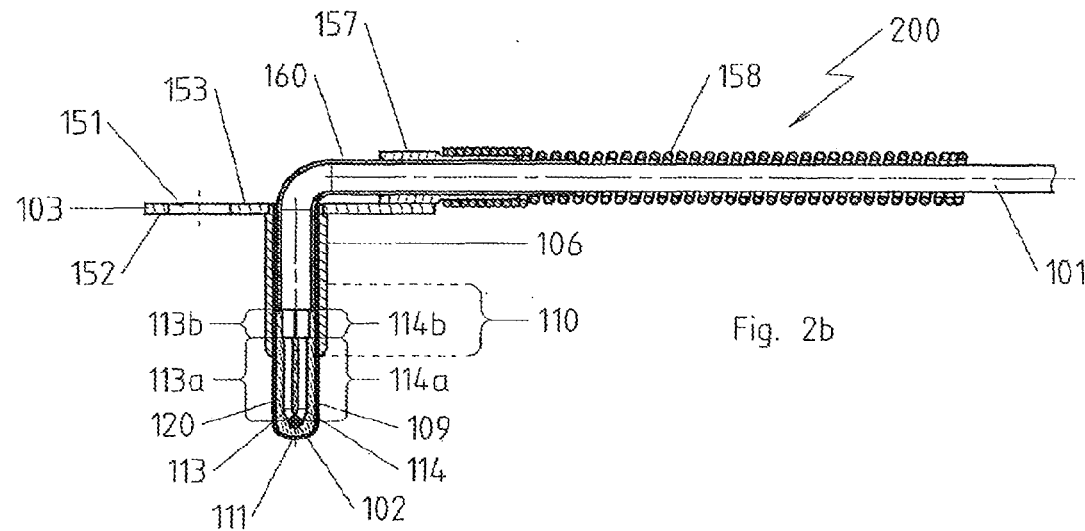
FIG. 2b is a cross sectional view through the corresponding partial area of a second exemplary embodiment for a temperature sensor according to the present invention.

FIG. 2b shows a cross section through the corresponding partial area of a second exemplary embodiment for a temperature sensor 200 according to the present invention. The individual components of the temperature sensor 200 are identical to the corresponding components of the temperature sensor 100 described in detail on the basis of FIGS. 1 and 2a, and they are therefore designated by identical reference numbers. The only difference between the temperature sensors 100 and 200 is in the relative positions of the second metal jacket 109 and of the first metal jacket 106 in relation to one another. The temperature sensor 200 according to FIG. 2b is adapted to a deeper hole than the temperature sensor 100 according to FIGS. 1 and 2a. The second metal jacket 109 therefore protrudes farther from the first metal jacket 106.

Figure 2C:
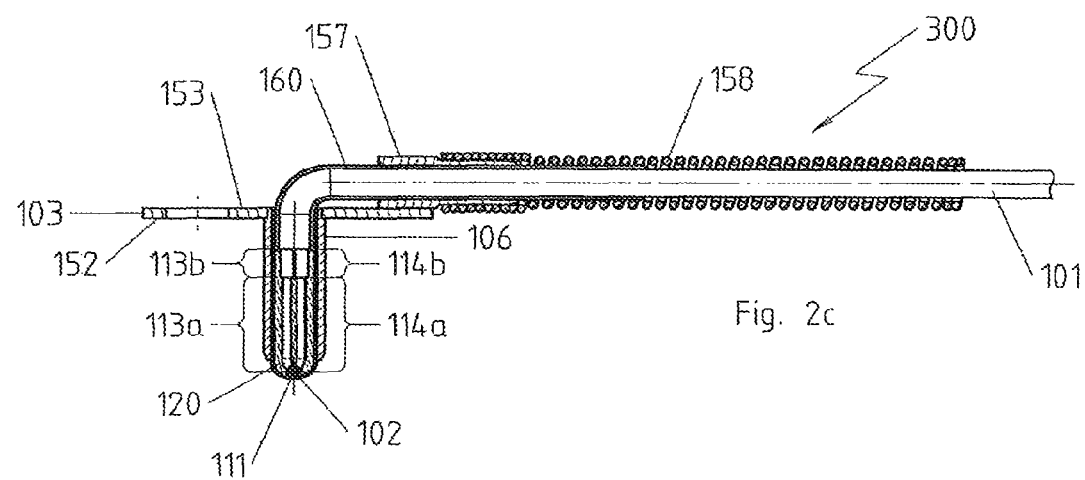
FIG. 2c is a cross sectional view through the corresponding partial area of a third exemplary embodiment for a temperature sensor according to the present invention.

FIG. 2c shows a cross section through the corresponding partial area of a third exemplary embodiment for a temperature sensor 300 according to the present invention. The individual components of the temperature sensor 300 are identical to the corresponding components of the temperature sensor 100 described in detail on the basis of FIGS. 1 and 2a, and they are therefore designated by identical reference numbers. The only difference between the temperature sensors 100 and 300 is in the relative positions of the measuring point 102 of the thermocouple 101 in the second metal jacket 109. The measuring point 102 of thermocouple 101 is in direct contact with the bottom 111 of the second metal jacket 109 in the temperature sensor according to FIG. 2c.

Another, independent partial aspect of the present invention pertains to a process for manufacturing a temperature sensor. The process, which will be described below with reference to FIGS. 3a through 3c based on the example of the manufacture of a temperature sensor 100 as it was described above on the basis of FIGS. 1 and 2a, has the following steps, which are preferably carried out in the order given:

a) Providing a holder 103 having a contact surface 152 for bringing it into contact with a component to be heated and an opening 104, wherein a first metal jacket 103 is arranged at a contact surface of holder 103 or in such a way that it passes at least partly through such that an interior 107 of the first metal jacket 106 is connected through the opening 104 to the side of holder 103 located opposite the contact surface, and a thermocouple 101, whose measurement point 102 is arranged in the interior 108 of a second metal jacket 109, wherein a guide element 157 is pushed over the thermocouple 101.

Provisions are made in an advantageous variant of this process step for the thermocouple 101 thus embodied to be provided such that measurement point 102 is pushed into the second metal jacket 109, after which a powdered material 120, which has good thermal conductivity but is electrically insulating, is strewn in and compaction of the second metal jacket 109 is finally performed.

b) Bending of the thermocouple 101 in an area adjoining the second metal jacket 109 and insertion of the second metal jacket 109 into the interior 107 of the first metal jacket 106. FIG. 3a shows the process stage during the performance of this process step.

c) Fixation of the second metal jacket 109 in the first metal jacket 106 and of the guide element 157 on the thermocouple 101 and on the holder 103. This process step is shown schematically in FIG. 3b for an embodiment of the process in which the fixation is just taking place by caulking; FIG. 3c shows the stage reached thereafter.

An anti-kinking spring 157 can then optionally also be arranged at guide element 157.

While specific embodiments of the invention have been shown and described in detail to illustrate the application of the principles of the invention, it will be understood that the invention may be embodied otherwise without departing from such principles.

APPENDIX

List of Reference Numbers

| | |
|---|---|
| 100, 200, 300 | Temperature sensor |
| 101 | Thermocouple |
| 102 | Measurement point |
| 103 | Holder |
| 105 | Electric connections |
| 106 | First metal jacket |
| 107 | Interior of the first metal jacket |
| 108 | Interior of the second metal jacket |
| 109 | Second metal jacket |
| 110 | Section of the second metal jacket |
| 111 | Bottom |
| 120 | Electrically insulating material having good thermal conductivity |
| 113, 114 | Thermocouple leg |
| 113a, 114a | First area of the thermocouple legs |
| 113b, 114b | Second area of the thermocouple legs |
| 151 | Hole |
| 152 | Contact surface |
| 153 | Side located opposite the contact surface |
| 154, 155 | Connection lines |
| 157 | Guide element |
| 158 | Anti-kinking spring |
| 159 | Caulking site |
| 160 | Insulating tube |

What is claimed is:

1. A temperature sensor comprising:
   a thermocouple having a measurement point;
   a holder with a contact surface for coming into contact with a component to be heated and with an opening, wherein electric connections of the thermocouple are led through the opening starting from the measurement point;
   a first metal jacket arranged on the contact surface of the holder or connected to the holder so as to pass at least partly through said contact surface such that an interior of the first metal jacket is connected through the opening to a side located opposite the contact surface or to another side of the holder, said first metal jacket comprising a first metal jacket inner surface, said first metal jacket inner surface defining a first metal jacket interior space and an internal diameter of said first metal jacket, said first metal jacket inner surface extending continuously, without interruption, from one end portion of said first metal jacket to another end portion of said first metal jacket; and a second metal jacket comprising a second metal jacket inner surface and a second metal jacket outer surface, said second metal jacket inner surface defining a second metal jacket interior space, said second metal jacket outer surface defining an external dimension of said second metal jacket, wherein the measurement point is arranged in said second metal jacket interior space, and the second metal jacket is located at least with one section in said first metal jacket interior space such that a change in a position of said measurement point is compensated by displacement of said second metal jacket relative to said first metal jacket in an unfixed state of said first metal jacket and said second metal jacket, and the second metal jacket can be or is connected at least by a partial area of the one section to the first metal jacket such that the second metal jacket is fixed in terms of its position relative to the first metal jacket in a fixed state of said first metal jacket and said second metal jacket, wherein in at least one direction, said external dimension is equal to said internal diameter of the first metal jacket in the one direction, said second metal jacket outer surface being in contact with said first metal jacket inner surface in an area that is arranged in said first metal jacket interior space.

2. A temperature sensor in accordance with claim 1, wherein said second metal jacket, with a section of said thermocouple arranged therein, has such a strength that said second metal jacket cannot be bent by hand.

3. A temperature sensor in accordance with claim 1, wherein said thermocouple comprises thermocouple legs, thermocouple leads and/or compensating leads, which have insulation at least partly thereon, and said thermocouple legs, thermocouple leads and/or said compensating leads and at least part of said insulation are led directly out of said second metal jacket.

4. A temperature sensor in accordance with claim 1, wherein said first metal jacket is a tubular or cup-shaped metal sleeve, wherein said shape of said second metal jacket is adapted to a shape of said first metal jacket.

5. A temperature sensor in accordance with claim 1, wherein a diameter of an interior of said second metal jacket equals at least 50% of said internal diameter of said first metal jacket.

6. A temperature sensor in accordance with claim 1, further comprising a guide element arranged on said holder, wherein an edge of said second metal jacket located away from said measurement point does not protrude over said guide element.

7. A temperature sensor in accordance with claim 6, wherein said edge of said second metal jacket located away from said measurement point is arranged within said interior of said first metal jacket.

8. A temperature sensor in accordance with claim 1, wherein said second metal jacket is a cup-shaped metal sleeve with a bottom, said holder comprising a component contacting side and a component non-contacting side, said second metal jacket being inserted into said opening from a position located on said component non-contacting side.

9. A temperature sensor in accordance with claim 8, wherein said measurement point is connected to said bottom or is arranged at a distance from said bottom that is smaller than or equal to a radius of said cup-shaped metal sleeve.

10. A temperature sensor in accordance with claim 1, further comprising an electrically insulating material, having good thermal conductivity, arranged in an interior of said second metal jacket, wherein at least a part of an area of said thermocouple extending in said interior of said second metal jacket is embedded in said electrically insulating material, said first metal jacket being connected to said second metal jacket via a force-fit connection in said fixed state, at least one of said first metal jacket and said second metal jacket being in a deformed state in said fixed state.

11. A temperature sensor in accordance with claim 10, wherein said measurement point is a contact point of two thermocouple legs, comprising different materials, wherein said thermocouple legs are embedded with direct contact in said electrically insulating material at least on sections of said thermocouple that directly adjoin said measurement point.

12. A temperature sensor in accordance with claim 10, wherein said electrically insulating material is a mineral insulation or a ceramic insulation, a compacted mineral insulation or a compacted ceramic insulation.

13. A temperature sensor in accordance with claim 10, wherein insulated sections of thermocouple legs, thermocouple leads or compensating leads, are embedded in said electrically insulating material.

14. A temperature sensor in accordance with claim 13, wherein a site at which the sections of said thermocouple arranged in said interior of said second metal jacket on which sections of said thermocouple has insulation, transition over in a direction of said measurement point into sections of said thermocouple that have no insulation, is located under said contact surface of the holder.

15. A temperature sensor in accordance with claim 13, wherein said sections of said thermocouple, which are embedded in said electrically insulating material and which have insulation, are embedded in said electrically insulating material such that a force needed to pull said sections of said thermocouple out of said electrically insulating material is higher than 40 N.

16. A temperature sensor arrangement in accordance with claim 1, further comprising a guide element arranged on said holder, wherein an edge of said second metal jacket located away from said measurement point does not protrude over said guide element, said holder comprising a component contacting side and a component non-contacting side, said second metal jacket being inserted into said opening from a position located on said component non-contacting side.

17. A temperature sensor arrangement in accordance with claim 1, further comprising an electrically insulating material, having good thermal conductivity, arranged in an interior of said second metal jacket, wherein at least a part of an area of said thermocouple extending in said interior of said second metal jacket is embedded in the electrically insulating material, said first metal jacket being connected to said second metal jacket via a force-fit connection in said fixed state, at least one of said first metal jacket and said second metal jacket being in a deformed state in said fixed state, wherein a shape of said second metal jacket is adapted to a shape of said first metal jacket.

18. A temperature sensor arrangement in accordance with claim 17, wherein said measurement point is a contact point of two thermocouple legs, comprising different materials, wherein said thermocouple legs are embedded with direct contact in said electrically insulating material at least on sections of said thermocouple that directly adjoin said measurement point.

* * * * *